United States Patent [19]

Ferenc

[11] Patent Number: 4,792,717

[45] Date of Patent: Dec. 20, 1988

[54] WIDE ANGLE WARNING LIGHT

[75] Inventor: Robert A. Ferenc, Middletown, Conn.

[73] Assignee: Whelen Technologies, Inc., Chester, Conn.

[21] Appl. No.: 487,033

[22] Filed: Apr. 21, 1983

[51] Int. Cl.[4] .............................................. H01J 5/16
[52] U.S. Cl. ..................................... 313/113; 313/116
[58] Field of Search ................ 313/113, 110, 111, 116

[56] References Cited

U.S. PATENT DOCUMENTS 3,348,094  10/1967  Smith .................................... 313/113
4,310,773  1/1982  Zukowski ........................ 313/594 X

FOREIGN PATENT DOCUMENTS 767519  2/1957  United Kingdom ................ 313/113

Primary Examiner—David K. Moore
Assistant Examiner—K. Wieder
Attorney, Agent, or Firm—Chilton, Alix & Van Kirk

[57] ABSTRACT

A compact, wide angle light comprising a concave reflector, lens and light emitter. The lens is provided with spacially displaced parallel light spreaders while the reflector is comprised of a linear section, with side walls interconnected by a parabolic section, disposed between parabolic dish end sections.

13 Claims, 3 Drawing Sheets

WIDE ANGLE WARNING LIGHT

BACKGROUND OF THE INVENTION

The present invention relates to lights and, more particularly, warning lights having a wide angle radiation pattern, particularly in a single plane.

Lights employed on emergency vehicles such as police cars, ambulances, fire trucks and the like are required to produce light which is visible from all sides of the vehicle. The most common prior art vehicular mounted warning lights are dome type lights which often comprise a revolving lamp or mirror but which may comprise an xenon flash tube and cooperating cylindrically shaped lens. These prior types of lights are fairly expensive to manufacture. Further, prior art dome lights increase the overall height of the vehicle on which they are installed thus often presenting clearance problems. Naturally, it is highly desirable to provide a light which is capable of providing the required pattern of illumination while being of simple construction, economic to manufacture, easy to install and not causing an increase in vehicle height.

Accordingly, it is a principal object of the present invention to provide a warning light which produces a wide angle light pattern, particularly in a single plane.

It is a particular object of the present invention to provide a warning light which is compact, i.e., is characterized by minimum height and depth, while providing maximum intensity and illuminated area for the size of the light.

It is a further object of the present invention to provide a light which is characterized by uncomplicated construction, ease of assembly and installations and is inexpensive to manufacture.

It is an additional object of the present invention to provide a warning light particularly well suited to both installation on new vehicles and of being retrofitted on existing emergency vehicles.

Further objects and advantages of the present invention will appear hereinbelow.

SUMMARY OF THE INVENTION

In accordance with the present invention, the foregoing objects and advantages are readily obtained.

The present invention relates to a light and, more particularly, a compact wide angle light. In accordance with the present invention the light comprises a reflector, a lens adapted to be secured to the reflector and a light source mounted in the envelope defined by the reflector and lens. The lens is provided with a plurality of parallel, spacially separated spreader optic bands. The lens may also be provided with a centrally located "window", i.e., a region which is optically clear and of substantially constant thickness. The reflector comprises a linear parabolic section disposed between a pair of parabolic dish ends.

BRIEF DESCRIPTION OF THE DRAWINGS

The present invention may be better understood, and its numerous objects and advantages will become apparent to those skilled in the art, by reference to the accompanying drawing wherein like reference numerals refer to like elements in the several FIGS. and in which.

DETAILED DESCRIPTION

Figure 2:
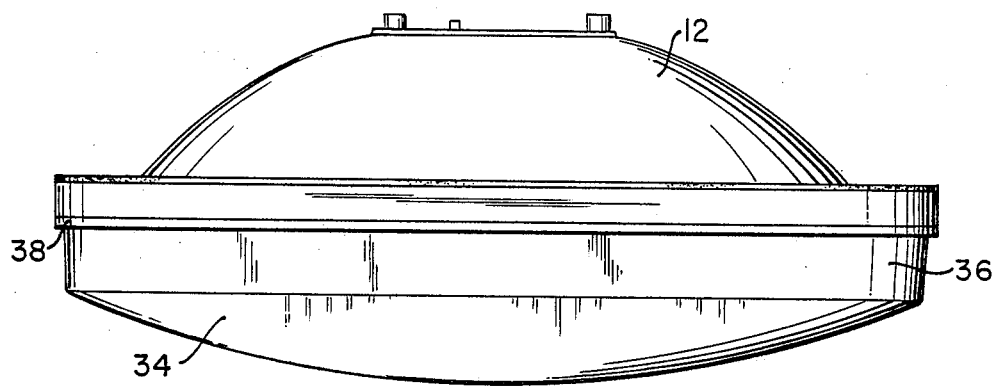
FIG. 2 is a top view of the light shown in FIG. 1.
Figure 1:
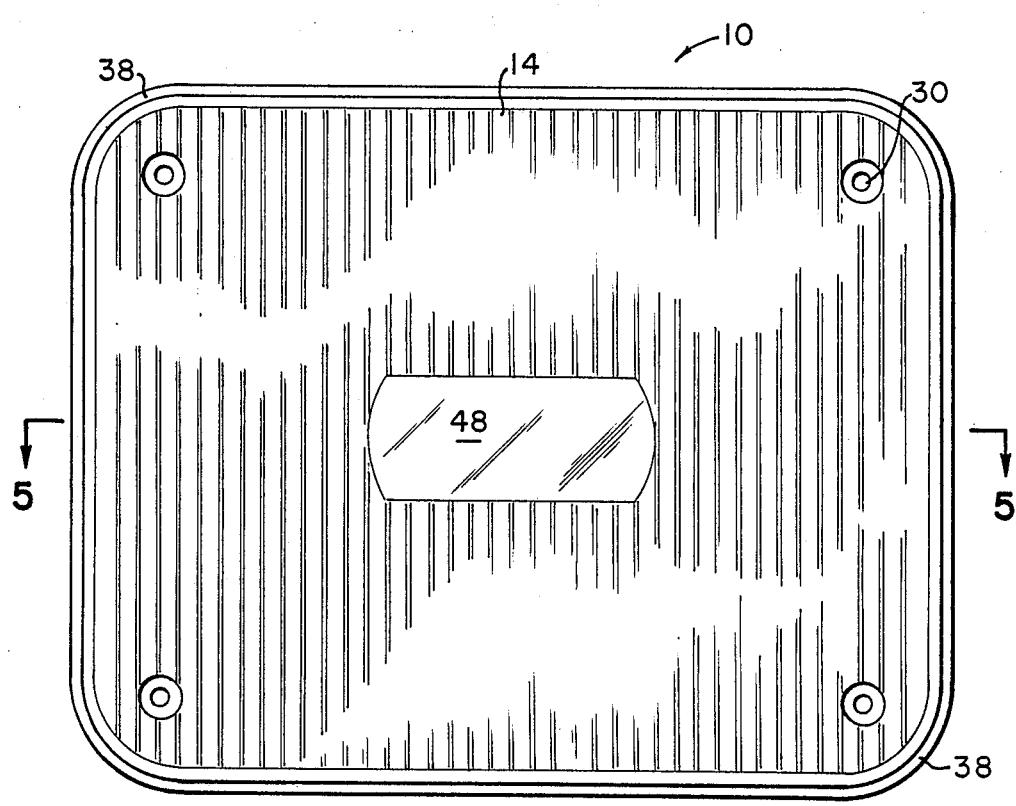
FIG. 1 is a front plan view of a warning light in accordance with the present invention.
Figure 7:
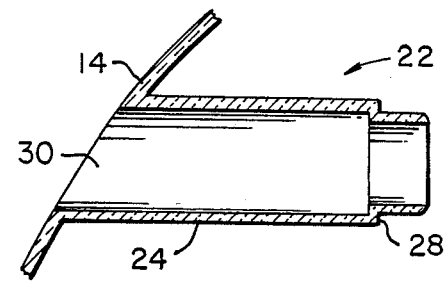
FIG. 7 is a partial sectional view of the light of FIG. 1.

Referring to the drawings, a light in accordance with the present invention is indicated generally at 10 in FIG. 1. Light 10 will, for example, be "flush" mounted in the side of an emergency vehicle immediately below the roof line. There will typically be a plurality of the lights 10 at the same height and spaced so as to provide a light emission pattern which is visible from all sides of the vehicle. Light 10 comprises a rear housing 12, which functions as a reflector, and a lens 14 which is adapted to be secured to housing 12. The housing 12, as best seen from FIG. 5, has a concave reflector portion 16 and a flanged peripheral portion 18 integrally molded to portion 16. In accordance with the preferred embodiment of the present invention, housing 12 is molded from a suitable thermoplastic material and the inner surface of portion 16 thereof is metallized to provide a reflective surface. The flanged portion 18 of housing 12 is provided with a plurality of orifices 20 which receive tubular projections 22, see FIG. 7, provided on the lens portion 14. A water seal gasket 50 is provided on the rear side of flanged portion 18.

As can best be seen in FIG. 7, the projection 22 comprises a first larger diameter portion 24 and a second smaller diameter portion 26 joined together so as to define a shoulder 28 which lies flush against the surface of flanged portion 18 on reflector housing 12 when the smaller diameter portion 26 is received within the orifices 20. The reflector housing 12 and the lens 14 are, in accordance with a preferred embodiment, permanently secured together by suitable means. The light may be mounted within an opening provided in a vehicle wall by means of fasteners received in the bore 30 defined by portions 24 and 26 of projection 22. A lamp 32 is supported in housing 12, the reflector portion 16 of housing 12 having an integral socket which receives lamp 32. Lamp 32 will typically be a gaseous discharge tube containing xenon gas but might be a halogen lamp.

Figure 6:
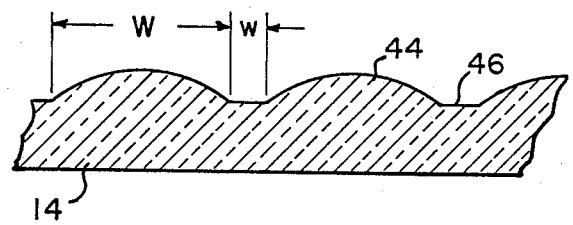
FIG. 6 is an enlarged sectional view in the direction of FIG. 5 showing details of a lens in accordance with the disclosed embodiment of the present invention.
Figure 5:
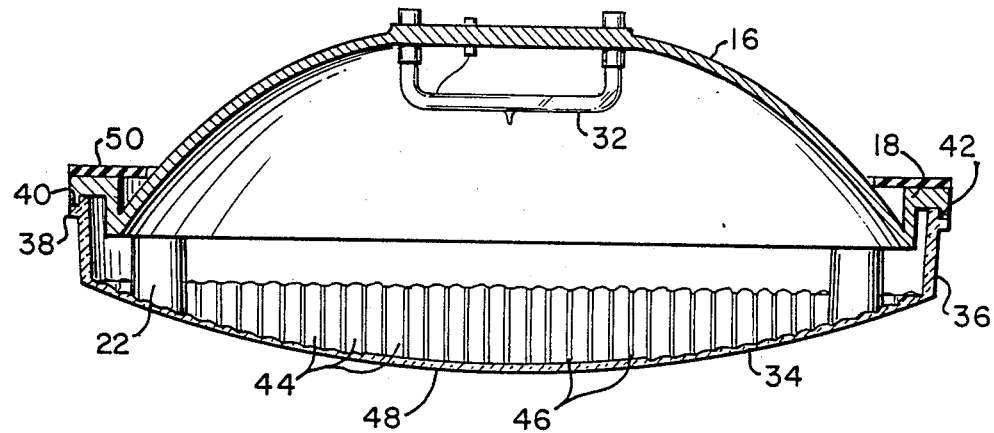
FIG. 5 is a cross-sectional view taken along line 5—5 of FIG. 1.

With reference simultaneously to FIGS. 1, 5 and 6, the details of the lens of the present invention will be discussed. The lens 14 is provided with a convex face portion 34 and a substantially rectangular edge portion 36 provided with a lip 38. The lip 38 cooperates with the edge portion 36 to define a peripheral recess 40. Recess 40 receives a lip 42 provided on the flanged portion 18 of the reflector housing 12. The projections 22 which define bore 30 are integrally molded to the convex face 34 of lens portion 14.

The convex face 34 of lens portion 14 is provided, on the surface thereof which faces the reflector, with a plurality of spacially displaced parallel spreader optic bars or bands. In accordance with the disclosed embodiment of the present invention these bands comprise elongated arcuate projections in the form of spherical surfaces 44 of width W which are separated from each other by flat areas 46 of width W. The center region of the inwardly facing side of lens portion 14 is provided with a substantially rectangular flat window area 48.

The spreaders 44 are shallow in the interest of reducing light loss while redirecting the light emitted by lamp 32 along a line which is transverse to the axes of the spreaders 44. Accordingly, the light produced by lamp 32 is visible over a much greater angle than would be the case if the spreaders 44 were not employed. The flats between the spreaders allow the passage of direct light rays with minimum attenuation. The window 48 passes, with minimum loss, light directly from lamp 32 and light directly reflected from the region of the reflector immediately surrounding the lamp.

Figure 3:
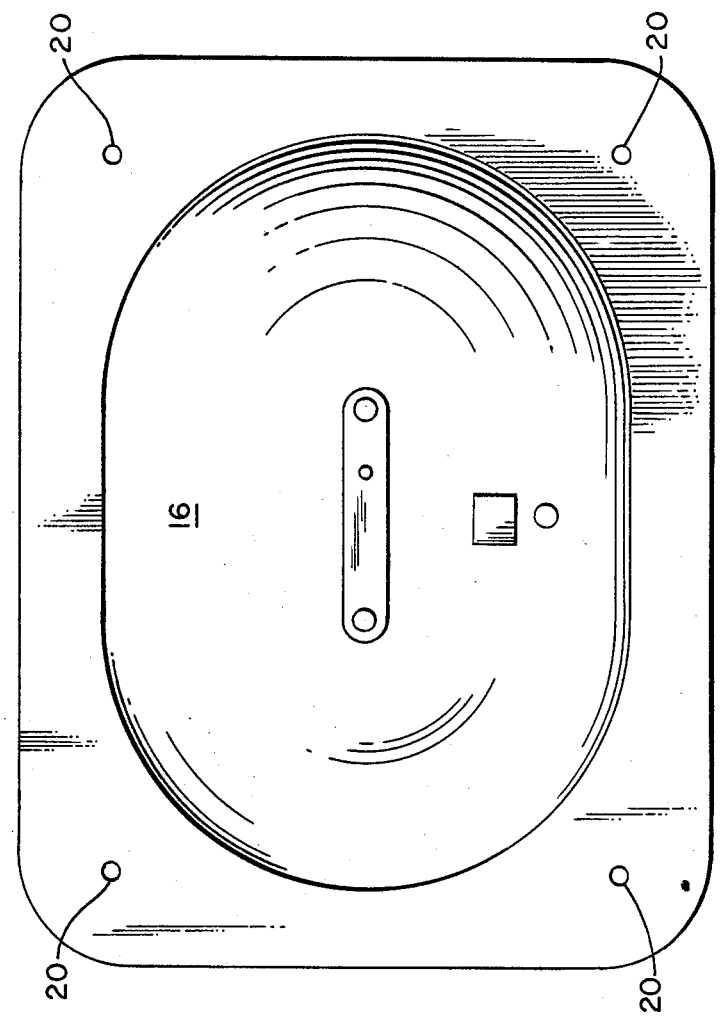
FIG. 3 is a back view of the light shown in FIG. 1.
Figure 4:
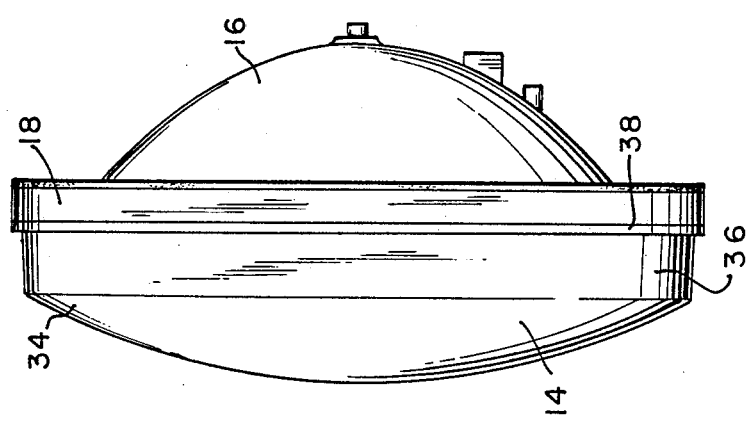
FIG. 4 is a side view of the light shown in FIG. 1.

The reflector, as may best be seen from a joint consideration of FIGS. 3 and 5, comprises a linear parabolic section disposed between a pair of parabolic dish ends, i.e., ends having concave surfaces which define portions of paraboloids of revolution about parallel axes. The intermediate linear section has a rear wall which, when viewed in cross-section and in a direction transverse to FIG. 5, defines a parabola having its focal point lying on a straight line which intersects said axes. This arrangement results in greater reflection, off the center linear section, at higher angles than could be obtained using a conventional dish-type parabolic reflector. The greater reflection at high angles maximizes the output intensity of the light since a comparatively high percentage of the generated light passes through the window 48 and the flats between the spreaders 44, i.e., through a single medium thereby minimizing losses. This arrangement also results in a light which has a greater output intensity when compared to that which could be obtained with a conventional parabolic reflector having the same total depth. Depth is a very important consideration since the light of the present invention, for maximum utility, must be capable of installation in, but not through, the side wall of a vehicle. The parabolic dish end sections will, in the known manner, provide a very directional light pattern, i.e., light rays which are generally normal to the inner surfaces of the flats 46 of lens 14.

The present invention thus comprises a warning light having a wide angle radiation pattern which, in the disclosed embodiment, will normally be directed in a horizontal plane. The light of the present invention is characterized by minimum height and depth while the output intensity and the area of illumination is maximized for the physical size of the light. The light in accordance with the present invention is also characterized by uncomplicated construction, and thus moderate cost, and is easy to assemble and install. It is particularly noteworthy that, in the case of an emergency vehicle, the light will be installed in the vehicle wall but will not protrude into the vehicle interior. For both cosmetic reasons and to minimize wind resistance, the extension of the light outwardly from the mounting surface will be kept to a minimum, i.e., a substantially flush mounted warning light is provided. Further, the above-described light is preferably a sealed beam-type device and, when the light source is a flash tube, the present invention will become a sealed beam strobe that is disposable either entirely or in part. A light in accordance with the present invention may be installed with the aid of a single water seal gasket. This may be contrasted with prior art sealed beam-type lights which are typically comprised of seven (7) or more components including a mounting base, multiple gaskets, and separate sealed beam lamp assemblies including a reflector, a lamp with inner lens and an outer lens. It is noteworthy that a typical prior art sealed beam type of light, in addition to being expensive because of the numerous components, is characterized by a comparatively high degree of attenuation since the emitted light must successively pass through two (2) mediums of plastic or glass, i.e., the inner and outer lenses. As discussed above, in the light of the present invention the reflector is designed to maximize output intensity while keeping the depth of the assembly to a minimum and while simultaneously achieving a wide angle radiation pattern. This novel reflector is, in the preferred embodiment, made integral with the mounting member for the light.

The reflector of the present invention cooperates with a novel lens which includes spreaders for achieving a more uniform radiation pattern, the avoidance of hot spots and for redirecting the direct and reflected light. In prior lights the use of spreaders inherently produced a significant, and often unacceptable, reduction in the head-on intensity level. In the disclosed embodiment of the present invention the spreaders are separated by means of flats and the lens is provided with a centrally disposed window and the generated light will pass through only a single medium and thus be minimally attenuated. While the lens of the light of the present invention employs spreaders to achieve the desired radiation pattern, these spreaders are shallow thereby reducing losses.

It is to be understood that the invention is not limited to the illustration described and shown herein, which is deemed to be merely illustrative of the best mode of carrying out the invention, and which is susceptible of modification of form, size, arrangement of parts and details of operation. The invention rather is intended to encompass all such modifications which are within its spirit and scope as defined by the claims.

What is claimed is:

1. A wide angle light source comprising:
   means defining a reflector, said reflector defining means including:
   a first end section, said first end section having a concave reflective surface which defines a first portion of a paraboloid of revolution about a first axis, said concave reflective surface of said first end section extending inwardly from an arcuate forward edge;
   a second end section, said second end section having a concave reflective surface which defines a second portion of said paraboloid of revolution, said second end section defining a second axis parallel to said first axis, said concave reflective surface of said second end section extending inwardly from an arcuate forward edge which is coplanar with said arcuate forward edge of said first end section; and
   a linear intermediate section having a concave reflective surface, said intermediate section being integral with and extending between said end sections, said intermediate sections having a rear wall which interconnects a pair of parallel side wall portions, said rear wall at least in part defining said concave reflective surface of said intermediate section and having a profile which is a parabola having a focal point defining a straight line intersecting said first and second axes, said side wall portions of said intermediate section defining a pair of parallel linear forward edges which are co-planar with said arcuate forward edges;

lens means adapted to be secured to said reflector defining means, said lens means and reflector defining means cooperating to form a chamber bounded in part by said concave reflective surfaces, said lens means having a light transmissive portion which is provided with a plurality of parallel spaced apart surface irregularities for dispersing light over an angle, said light transmissive portion of said lens means being disposed at a first side of the plane defined by said arcuate and linear forward edges of said reflector sections; and an elongated light emitter centrally supported from said reflector defining means so as to be positioned in said chamber, said light emitter having an axis, said light emitter axis being oriented generally parallel to said reflector defining means intermediate section forward edges, said light emitter axis being positioned at the second side of said plane defined by said reflector defining means arcuate and linear forward edges.

2. A light according to claim 1 wherein said surface irregularities have an arcuate shape and are positioned on the side of said lens means which faces said reflector defining means.

3. A light according to claim 1 wherein said surface irregularities are separated by flat areas.

4. A light according to claim 3 wherein said surface irregularities are of spherical shape.

5. A light according to claim 1 wherein said lens means is convex shaped.

6. A light according to claim 1 wherein the center of the lens means is provided with a substantially rectangular flat window area, said window area interrupting said surface irregularities.

7. A light according to claim 5 wherein said surface irregularities are separated by flat areas.

8. A light according to claim 7 wherein said surface irregularities have an arcuate shape and are positioned on the side of said lens means which faces said reflector defining means.

9. A light according to claim 8 wherein the center of the lens means is provided with a substantially rectangular flat window area, said window area interrupting said surface irregularities.

10. A light according to claim 8 wherein said light emitter is a gaseous discharge tube and is supported above said reflector defining means linear section.

11. A light according to claim 10 wherein the center of the lens means is provided with a substantially rectangular flat window area, said window area interrupting said surface irregularities.

12. A light according to claim 11 wherein said surface irregularities are of spherical shape.

13. A light according to claim 10 wherein said reflector defining means and said lens means are permanently joined.

* * * * *

REEXAMINATION CERTIFICATE (1632nd)

United States Patent [19]

Ferenc

[11] B1 4,792,717

[45] Certificate Issued Jan. 28, 1992

[54] WIDE ANGLE WARNING LIGHT

[75] Inventor: Robert A. Ferenc, Middletown, Conn.

[73] Assignee: Whelen Technologies, Inc.

Reexamination Request:
No. 90/002,070, Jun. 29, 1990

Reexamination Certificate for:
Patent No.: 4,792,717
Issued: Dec. 20, 1988
Appl. No.: 487,033
Filed: Apr. 21, 1983

[51] Int. Cl.$^5$ .................................................. H01J 5/16
[52] U.S. Cl. ..................................... 313/113; 313/116; 362/310; 362/346
[58] Field of Search ................ 362/346, 349, 298, 300, 362/307, 310

[56] References Cited

U.S. PATENT DOCUMENTS

| | | | |
|---|---|---|---|
| D. 124,016 | 2/1972 | Schneider | 362/338 |
| D. 130,745 | 12/1941 | Mausshardt . | |
| D. 217,386 | 4/1970 | Muneoka | D12/99 |
| 1,465,615 | 8/1923 | Nelson | 219/347 |
| 1,480,364 | 1/1924 | Bean | 362/296 |
| 1,522,853 | 1/1925 | Bell | 362/333 |
| 1,739,179 | 6/1926 | Rassler | 362/336 |
| 1,889,188 | 11/1932 | Bean | 362/350 |
| 1,898,166 | 2/1933 | Bean | 362/350 |
| 2,260,894 | 10/1941 | Field | 240/7.35 |
| 2,475,365 | 7/1949 | Walsh | 362/343 |
| 3,348,094 | 10/1967 | Smith | 315/71 |
| 4,276,584 | 6/1981 | Ichikawa | 362/308 |
| 4,310,773 | 1/1982 | Zukowski et al. | 313/221 |
| 4,386,824 | 6/1983 | Draper | 362/346 X |
| 4,412,276 | 10/1983 | Blinon | 362/310 X |

FOREIGN PATENT DOCUMENTS

767519  2/1957  United Kingdom .

OTHER PUBLICATIONS

G. E. Catalog, Nov. 1981 (front cover, p. 5, back cover).
G. E. Parabolic Trough Reflector Drawing dated 3/8/79.
G. E. Fresnel lens drawing dated 2/21/79.
Optical Textbook entitled "Optical Design of Reflectors," by William B. Elmer, ©1980, by John Wiley & Sons, Inc.
Magazine article entitled "New Developments in Electronic Flashtubes," by John H. Goncz of E. G. & G., Inc., dated 8/27/65, FIG. 8.
E. G. & G. Technical Data Sheet for Pi-shaped Xenon Flashtubes, dated 11/69.

*Primary Examiner*—Sandra L. O'Shea

[57] ABSTRACT

A compact, wide angle light comprising a concave reflector, lens and light emitter. The lens is provided with spacially displaced parallel light spreaders while the reflector is comprised of a linear section, with side walls interconnected by a parabolic section, disposed between parabolic dish end sections.

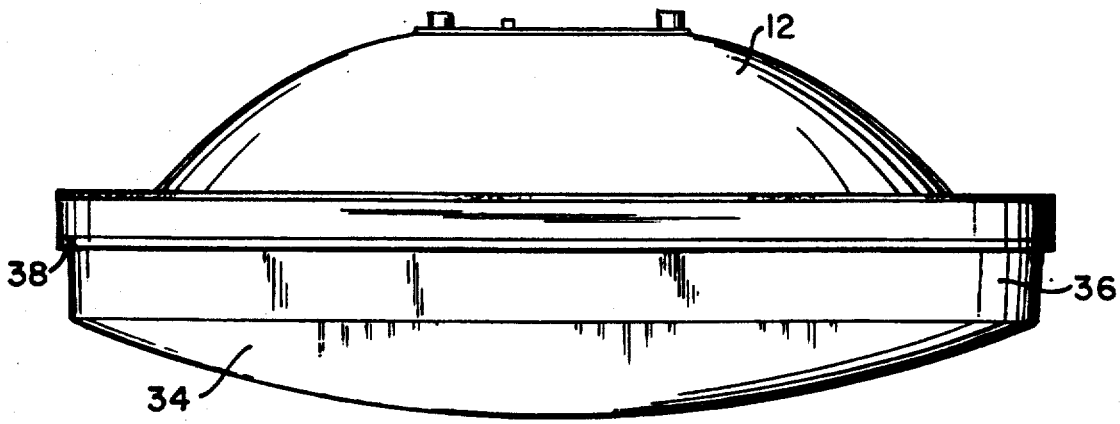

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-13 is confirmed.

* * * * *